United States Patent
Takei et al.

(10) Patent No.: US 11,916,442 B2
(45) Date of Patent: Feb. 27, 2024

(54) ROTOR, ROTARY ELECTRIC MACHINE, METHOD OF MANUFACTURING ROTOR, AND METHOD OF COLLECTING PERMANENT MAGNET

(71) Applicant: HONDA MOTOR CO., LTD., Tokyo (JP)

(72) Inventors: Yasuhito Takei, Saitama (JP); Hiroshi Kimura, Saitama (JP); Atsushi Kubota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 17/676,861

(22) Filed: Feb. 22, 2022

(65) Prior Publication Data
US 2022/0302782 A1 Sep. 22, 2022

(30) Foreign Application Priority Data
Mar. 22, 2021 (JP) .................. 2021-047862

(51) Int. Cl.
*H02K 1/27* (2022.01)
*H02K 1/28* (2006.01)
*H02K 15/03* (2006.01)
*H02K 15/00* (2006.01)
*H02K 1/276* (2022.01)

(52) U.S. Cl.
CPC .............. *H02K 1/28* (2013.01); *H02K 1/276* (2013.01); *H02K 15/0006* (2013.01); *H02K 15/03* (2013.01)

(58) Field of Classification Search
CPC ...... H02K 1/28; H02K 1/276; H02K 15/0006; H02K 15/03; H02K 1/02; H02K 1/2766; H02K 3/28; H02K 3/48; H02K 3/50
See application file for complete search history.

(56) References Cited

U.S. PATENT DOCUMENTS

| | | | |
|---|---|---|---|
| 2015/0153540 A1* | 6/2015 | Lee ................... | H02K 41/0356 348/357 |
| 2020/0059140 A1* | 2/2020 | Braun .................. | H02K 1/223 |

FOREIGN PATENT DOCUMENTS

| | | | |
|---|---|---|---|
| JP | 2005218253 A | 8/2005 | |
| JP | 2005269839 A | 9/2005 | |
| JP | 2006283894 A | 10/2006 | |
| JP | 2007333099 A | 12/2007 | |
| JP | 2008008467 A | 1/2008 | |
| JP | 2008043053 A | 2/2008 | |
| JP | 2016077035 A | 5/2016 | |

(Continued)

OTHER PUBLICATIONS

Office Action issued for counterpart Japanese Application No. 2021-047862, issued by the Japanese Patent Office dated Mar. 22, 2023 (dated Feb. 16, 2023).

(Continued)

*Primary Examiner* — Thomas Truong

(57) ABSTRACT

A rotor may be provided with a rotor core that is fixed to a shaft and includes a plurality of through holes along an axial direction of the shaft. The rotor may be provided with a permanent magnet disposed in each of the plurality of through holes. The rotor may be provided with a functional fluid having a magneto rheological effect of fixing the permanent magnet in each of the plurality of through holes.

9 Claims, 11 Drawing Sheets

(56) References Cited

FOREIGN PATENT DOCUMENTS

WO         2020230973 A1    11/2020
WO   WO-2020230973 A1 * 11/2020

OTHER PUBLICATIONS

Office Action issued for counterpart Japanese Application No. 2021-047862, issued by the Japanese Patent Office dated Nov. 29, 2022 (dated Nov. 15, 2022).

* cited by examiner

ROTOR, ROTARY ELECTRIC MACHINE, METHOD OF MANUFACTURING ROTOR, AND METHOD OF COLLECTING PERMANENT MAGNET

The contents of the following Japanese patent application(s) are incorporated herein by reference:
NO. 2021-047862 filed in JP on Mar. 22, 2021

BACKGROUND

1. Technical Field

The present invention relates to a rotor, a rotary electric machine, a method of manufacturing a rotor, and a method of collecting a permanent magnet.

2. Related Art

Patent Document 1 describes a field magnetic pole magnet body that can suppress an adhesive from remaining attached as an impurity when it is recycled.

CITATION LIST

Patent Document

Patent Document 1: Japanese Patent Application Publication No. 2016-77035

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
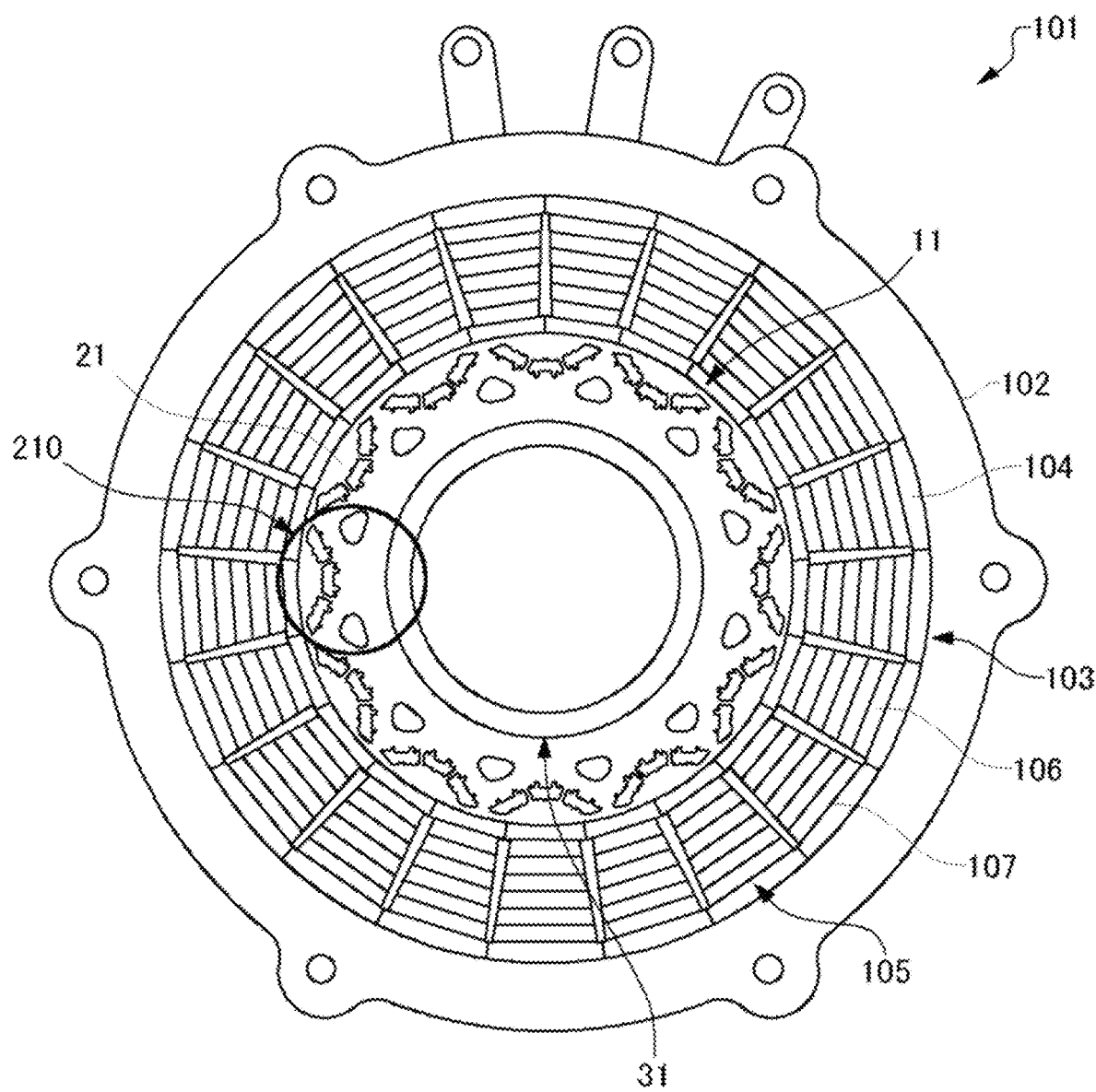
FIG. 1 is a cross-sectional view of a rotary electric machine.

FIG. 1 is a cross-sectional view of a rotary electric machine 101 including a rotor 11 according to the present embodiment. The rotary electric machine 101 may be mounted on a vehicle such as a hybrid vehicle or an electric vehicle. The rotary electric machine 101 may function as a traveling motor in a case where electric power is supplied from the outside, and may function as a generator during regenerative braking.

Note that the rotor 11 can be applied not only to the rotary electric machine 101 for vehicles, but also to motors and generators for other purposes. In addition, "above" and "below" in the description indicate the upper and lower parts in the drawings, and do not indicate the upper and lower parts of the rotary electric machine 101 being assembled to the vehicle.

The rotary electric machine 101 is provided with a case 102, a stator 103, the rotor 11, and a shaft 31. The case 102 has a substantially cylindrical shape that accommodates therein the stator 103 and the rotor 11. The stator 103 has a cylindrical shape and holds therein the rotor 11 rotatably about the axis of the shaft 31. The stator 103 includes a stator core 104, and a coil 105 mounted on the stator core 104.

The coil 105 is a three-phase coil formed by concentrated winding of the conductor 106, with the three phases being a U phase, a V phase, and a W phase. The coil 105 of each phase is formed by a plurality of segment coils 107 connected to each other. Each segment coil 107 is wound around the stator core 104, with the conductor 106 inserted into a plurality of slots included in the stator core 104. The segment coils 107 in the same phase are joined to the stator core 104 by welding or the like on one side of the axial direction. Note that the configuration of the coil 105 can be changed as appropriate. For example, the coil 105 is not limited to the segment coils 107, and may be mounted on the stator core 104 by a distributed winding method.

Figure 2:
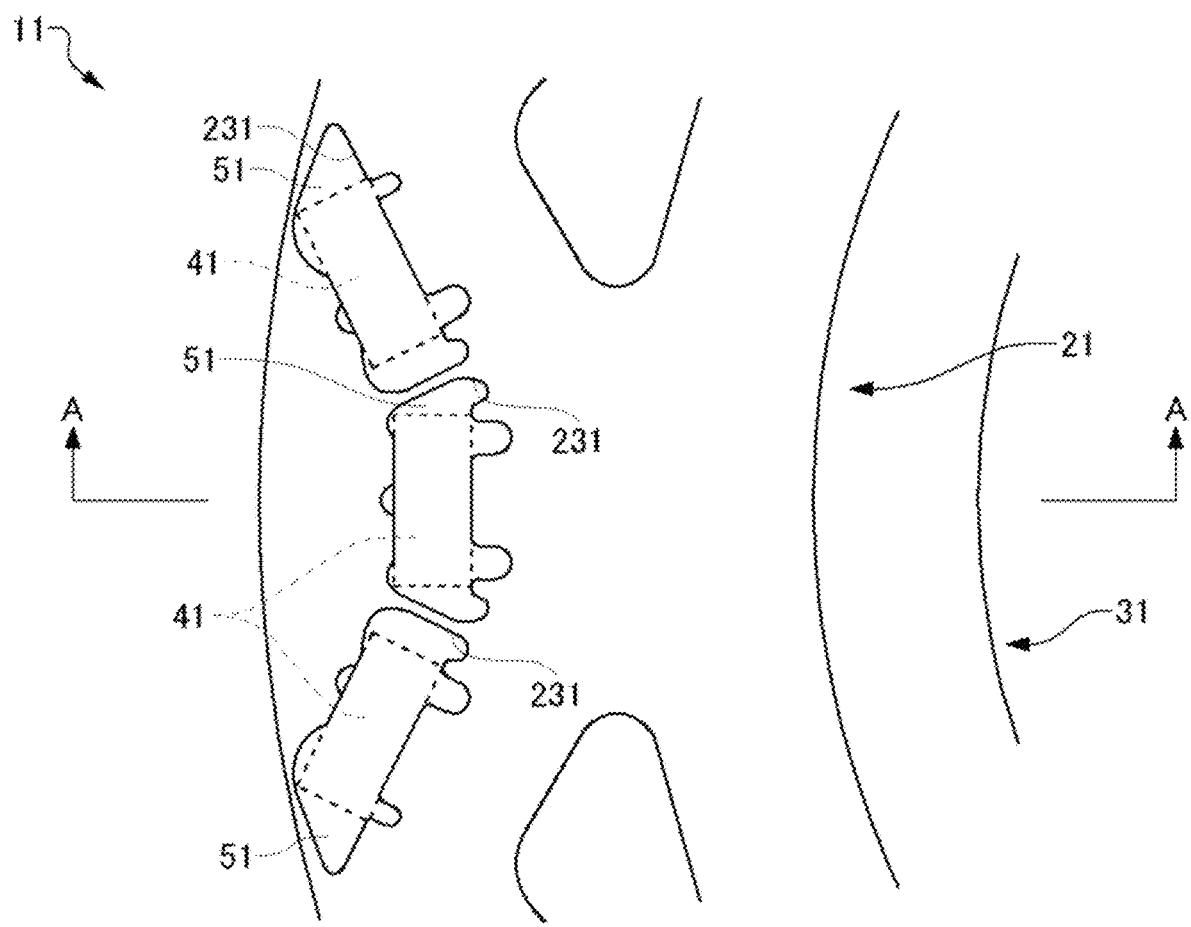
FIG. 2 is an enlarged view of a portion surrounded by a frame of FIG. 1.
Figure 3:
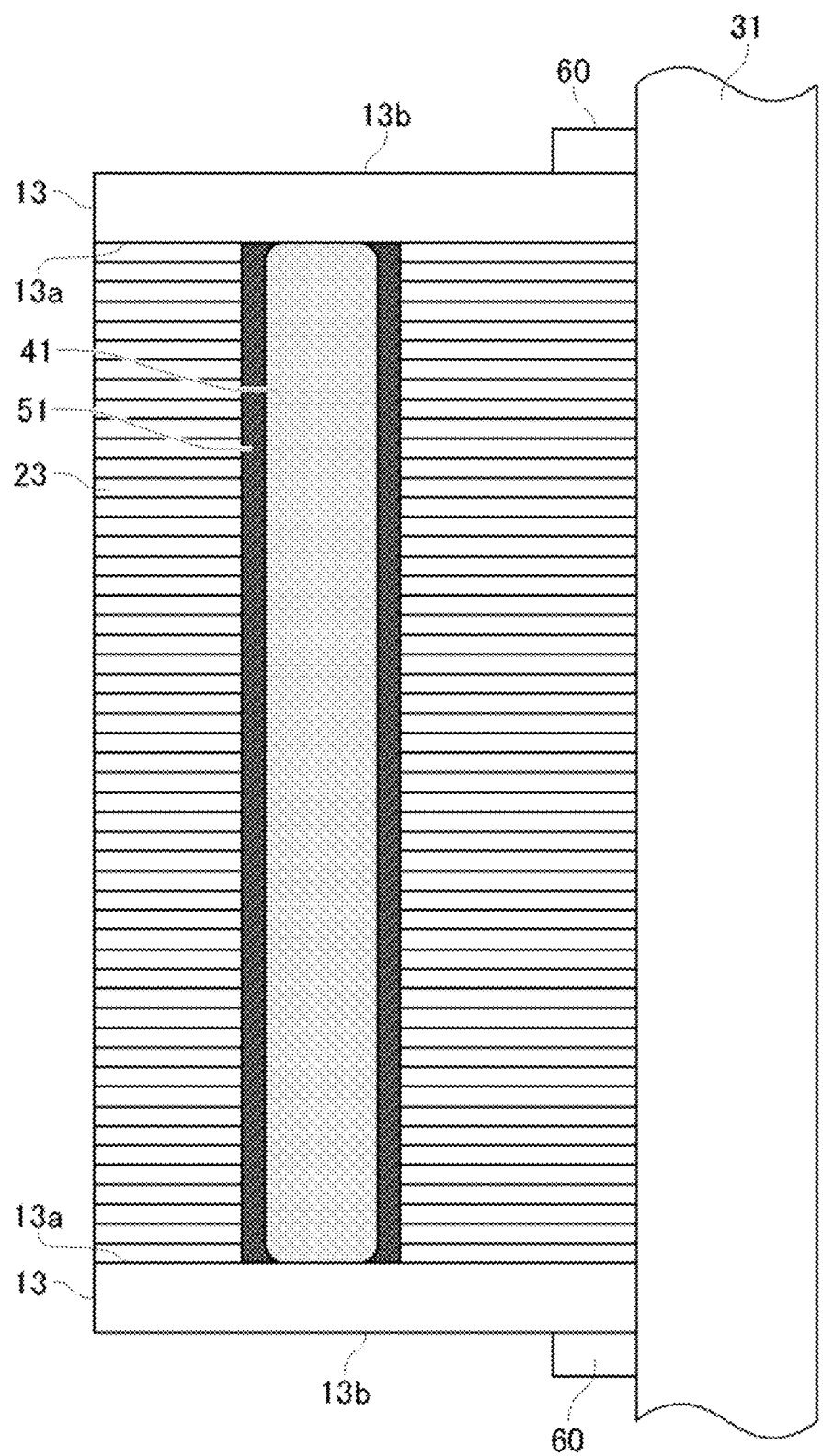
FIG. 3 is a schematic sectional view of a portion of a rotor viewed from line A-A shown in FIG. 2.

FIG. 2 shows a partially enlarged view of the portion indicated by a frame 210 shown in FIG. 1. FIG. 3 is a schematic partial cross-sectional view of the rotor 11 viewed from line A-A shown in FIG. 2. FIG. 3 is a schematic view showing only one side of the shaft 31 of the rotor 11 from the axis center.

The rotor 11 is rotatably supported by the axial center portion of the case 102. The rotor 11 is provided with a rotor core 21, the shaft 31, and a pair of end face plates 13. The rotor core 21 is formed into a substantially cylindrical shape by laminating, in the axial direction of the shaft 31, a plurality of thin plates 23 each composed of an annular steel plate. That is, the rotor core 21 is a stack of a plurality of thin plates 23. The shaft 31 is press-fitted into a through hole in the central portion of the rotor core 21 and fixed. The pair of end face plates 13 is disposed below the lowermost thin plate 23 and above the uppermost thin plate 23. The end face plate 13 is disposed to hide the lower end surface of an exposed permanent magnet 41.

Each of the end face plates 13 has a substantially annular shape whose outer peripheral surface is substantially the same as the outer peripheral surface of the rotor core 21 when viewed from the axial direction. The end face plate 13 has an inner surface 13a and an outer surface 13b. The inner surfaces 13a of the pair of end face plates 13 face the rotor 11 in the axial direction. Collars 60 abut the outer surface 13b of the end face plate 13, respectively. The collar 60 has an annular shape having a diameter smaller than that of the end face plate 13, and is fixed to the outer peripheral surface of the shaft 31. The rotor 11 and the pair of end face plates 13 are pressed inward in the axial direction by the pair of collars 60 and fixed to the shaft 31.

The thin plate 23 includes a plurality of through holes 231 penetrating in a plate thickness direction. The through holes 231 are disposed in a predetermined arrangement pattern in the circumferential direction of the thin plate 23. When being laminated, the thin plates 23 are aligned in the circumferential direction such that the through holes 231 overlap each other and communicate in the axial direction. The number of thin plates 23 to be laminated is appropriately set according to the depth dimension of the through hole 231. The permanent magnet 41 and an MR fluid 51 for fixing the permanent magnet 41 to the rotor core 21 are disposed in the through hole 231.

In the present embodiment, a configuration is described in which one permanent magnet 41 is accommodated in one through hole 231. However, the invention is not limited to such a configuration. For example, the configuration may be a configuration in which a plurality of permanent magnets 41 are accommodated in one through hole 231 as long as their shape can be accommodated in the through hole 231.

Here, it is conceivable to use a fixing material such as epoxy resin as a material for fixing the magnet in the rotor. In a case where a fixing material such as epoxy resin is used, when taking out the magnet for recycling or the like, the rotor is heated to a high temperature in a furnace and the fixing material is embrittled by incineration, and then the load is applied to extrude the magnet while destroying the fixing material. However, in such a method, the incinerated magnet may be clogged between the rotor and the magnet, and taking out of the magnet may be difficult. In addition, irreversible demagnetization due to exposure of the magnet to high temperatures may cause performance degradation. In this case, the reuse or recycling of the magnet may be hindered.

On the other hand, in the field magnetic pole magnet body as described in Patent Document 1, a plurality of magnet pieces are bonded by an adhesive resin material having electrolysis properties. Therefore, it is possible to cause separation between the magnet pieces to which the anode is connected and the adhesive by applying a voltage between the magnet pieces bonded by the adhesive resin material having electrolysis properties when recycling. As a result, it becomes possible to suppress the adhesive from remaining attached as an impurity. However, Patent Document 1 does not disclose a method of fixing a magnet in a rotor core. In addition, in the method of Patent Document 1, wiring work for conducting electricity is required when disassembling the magnet.

Therefore, in the present embodiment, the MR fluid 51 is used as a fixing material for fixing the permanent magnet 41 in the rotor core 21. The MR fluid 51 is an example of a functional fluid having a magneto rheological effect. As a fixing material, other functional fluids having the magneto rheological effect other than the MR fluid 51 may be used. As a fixing material, for example, a magneto rheological fluid (MRF), a magnetic fluid (MF), or a magnetic compound fluid (MCF) whose viscosity increases by applying a magnetic field may be used. As a fixing material, for example, a magnetic soft material may be used.

The MR fluid 51 is a magneto rheological fluid. The feature of the MR fluid 51 is that the viscosity and the like of the liquid can be controlled by applying a magnetic field from the outside. If the magnetic field is not generated, the MR fluid 51 is in a liquid state with low stress and viscosity, but the stress or viscosity increases depending on the strength of the magnetic field, and the MR fluid 51 becomes a semi-solid state. The MR fluid 51 is a material that can change from a liquid to a semi-solid according to the strength of the magnetic field or the strength of the current flowing through the coil, and conversely, can freely change the hardness of the liquid from the semi-solid to the liquid. Depending on the adjustment of the current, it can be changed greatly instantly or smoothly.

By using the MR fluid 51 having such characteristics as a fixing material for the permanent magnet 41, the MR fluid 51 is cured and the permanent magnet 41 is fixed in the through hole 231 when a magnetic field is applied to magnetize the unmagnetized member that is the base of the permanent magnet 41. On the contrary, when the permanent magnet 41 is demagnetized, the fixing between the permanent magnet 41 and the through hole 231 is released by softening the MR fluid 51, and the permanent magnet 41 can be easily taken out from the through hole 231. In this way, according to the rotor 11 according to the present embodiment, it is possible to provide the rotor 11 in which the rotor 11 is easily disassembled and the permanent magnet 41 is easily recycled.

Figure 4:
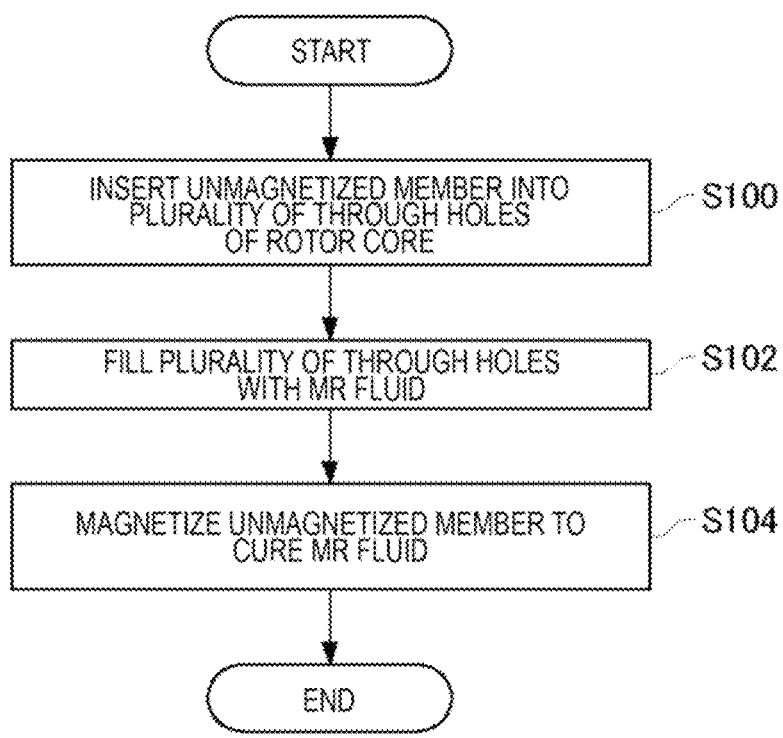
FIG. 4 is a flowchart showing an example of a procedure for fixing a permanent magnet to a rotor core.
Figure 5A:
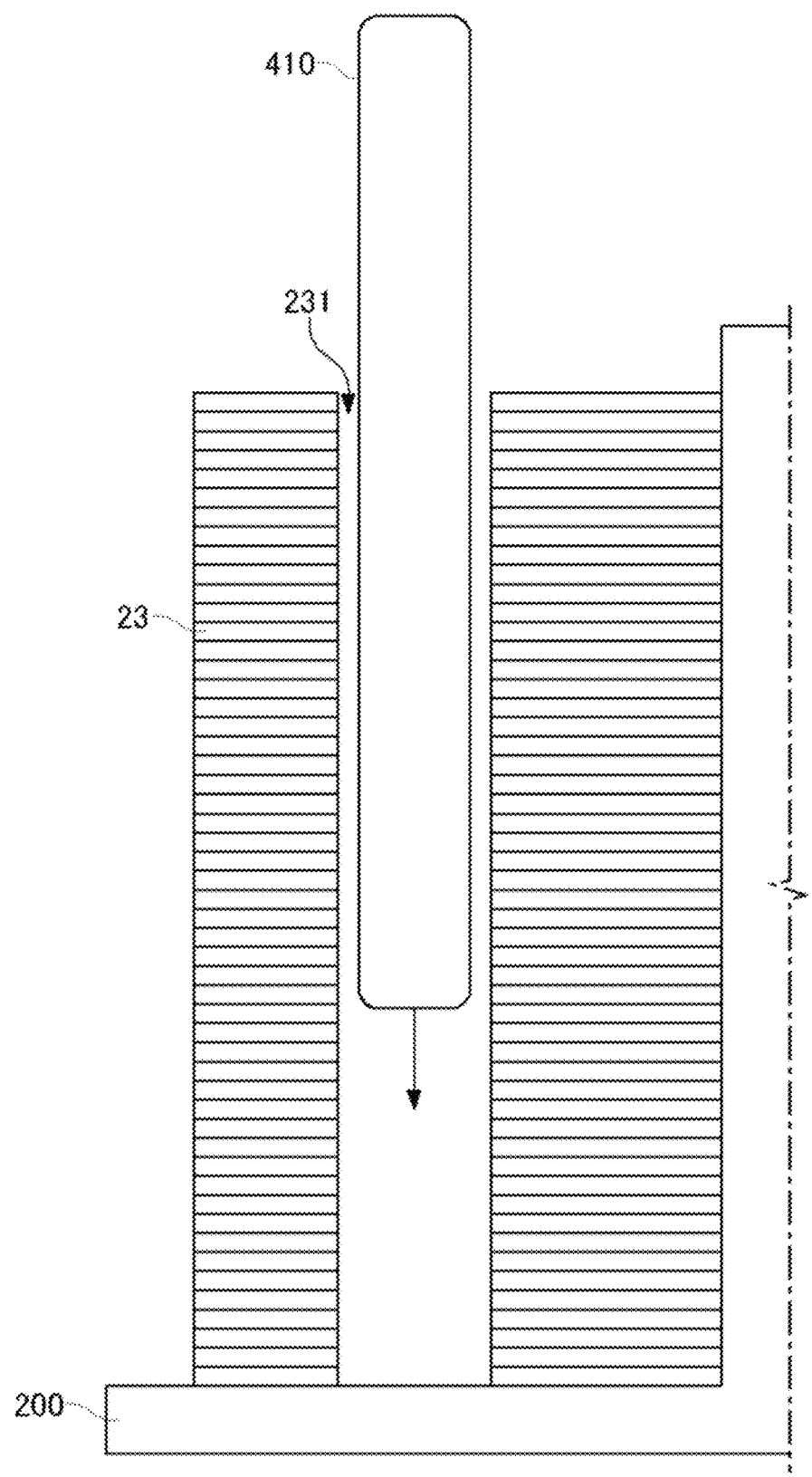
FIG. 5A is a diagram for explaining a procedure for fixing the permanent magnet to the rotor core.

FIG. 4 is a flowchart showing an example of a procedure for fixing the permanent magnet 41 to the rotor core 21. First, as shown in FIG. 5A, the rotor core 21 is disposed on a pedestal 200, and an unmagnetized member 410 which is the base of the permanent magnet 41 is inserted into the plurality of through holes 231 of the rotor core 21 (S100). After inserting the unmagnetized member 410, an upper lid 202 of the pedestal 200 covers the unmagnetized member 410 and the uppermost thin plate 23. The unmagnetized member 410 is a magnet material containing, for example, iron, neodymium, boron and the like as components.

Figure 5B:
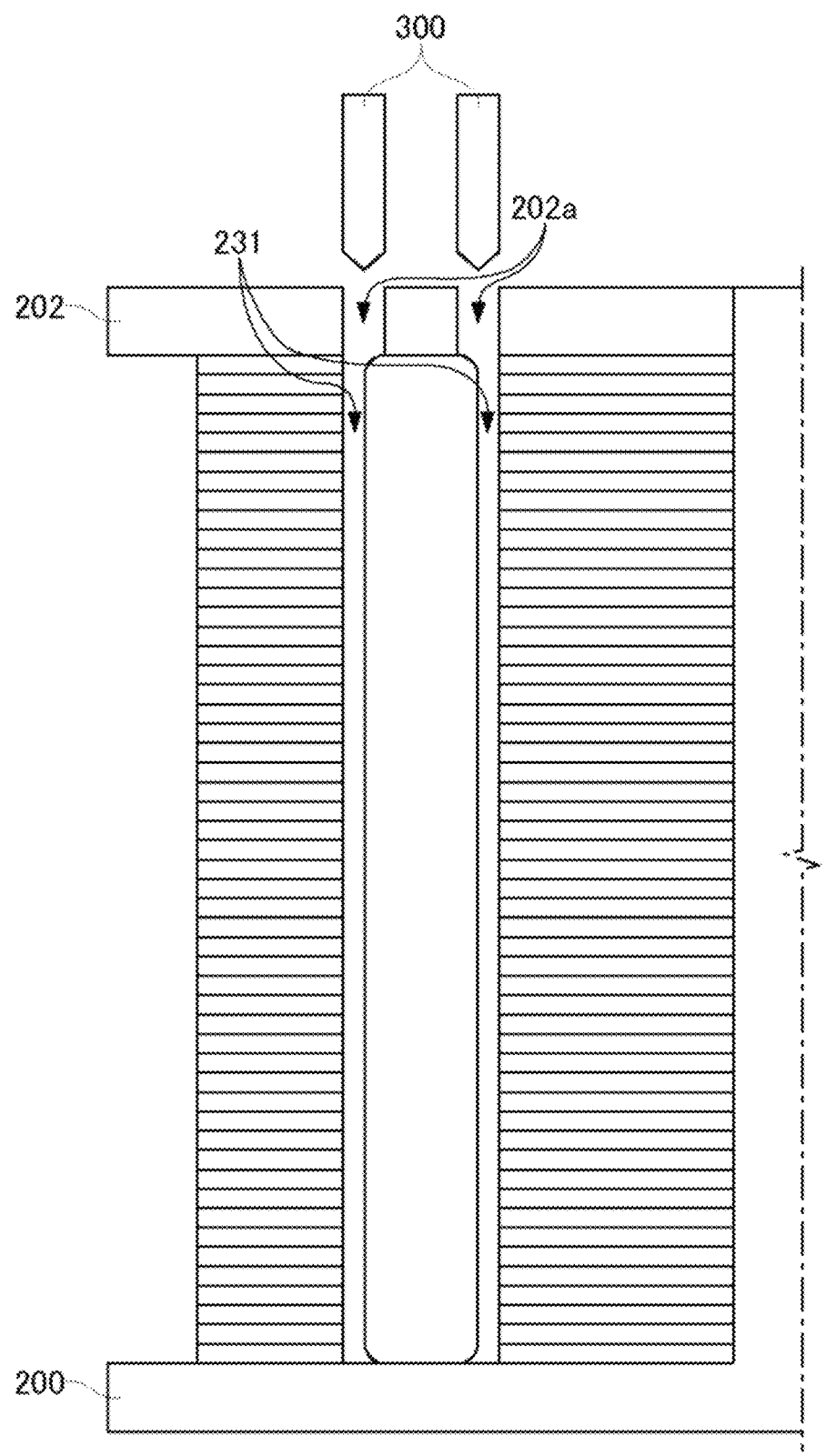
FIG. 5B is a diagram for explaining a procedure for fixing the permanent magnet to the rotor core.
Figure 5C:
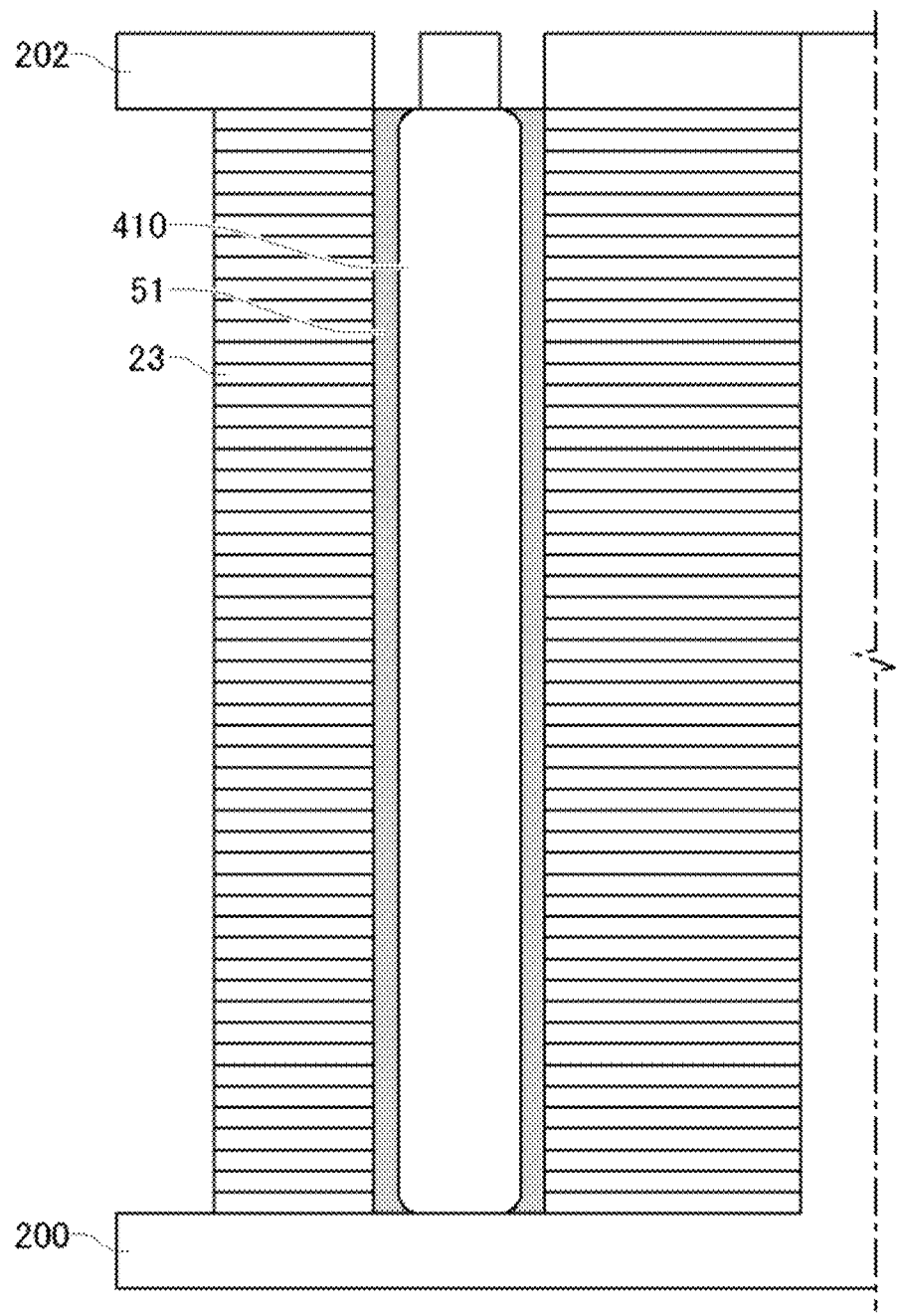
FIG. 5C is a diagram for explaining a procedure for fixing the permanent magnet to the rotor core.

The upper lid 202 includes an injection hole 202a at a position facing the through hole 231. After disposing the upper lid 202, as shown in FIG. 5B, the MR fluid 51 is injected from the injection hole 202a through a nozzle 300, and the plurality of through holes 231 are filled with the MR fluid 51 (S102). As shown in FIG. 5C, the MR fluid 51 is injected into a gap formed around the permanent magnet 41 in the through hole 231.

Figure 5D:
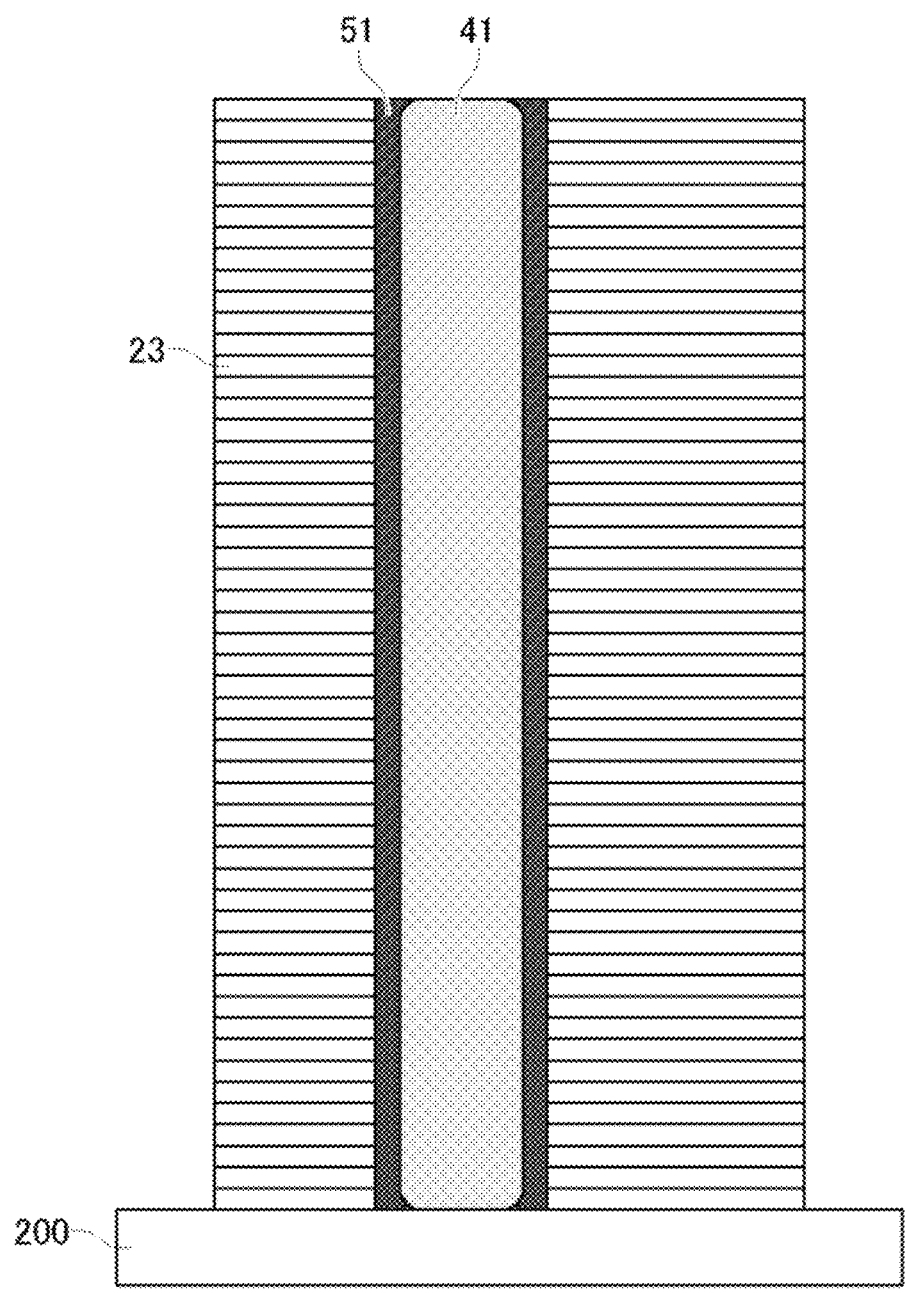
FIG. 5D is a diagram for explaining a procedure for fixing the permanent magnet to the rotor core.

Next, a magnetic field is applied to the unmagnetized member 410 from the outside to magnetize the unmagnetized member 410 into the permanent magnet 41, and also cure the MR fluid 51 (S104). FIG. 5D shows a state in which a magnetic field is applied to the unmagnetized member 410 from the outside to magnetize the unmagnetized member 410 into the permanent magnet 41, and also cure the MR fluid 51 to fix the permanent magnet 41 in the through hole 231.

The unmagnetized member 410 becomes the permanent magnet 41 when being magnetized by applying a magnetic flux equal to or higher than a saturation magnetic flux density from the outside. For magnetization, a magnetizing device provided with a magnetizing yoke and a magnetizing coil and a power source device dedicated to magnetizing to generate a magnetic field are used. The magnetizing coil generates a magnetic flux according to the magnitude of the current supplied from the power source device connected to the magnetizing coil. The power source device has a function of switching the polarity of the current supplied to the magnetizing coil. The polarity to be magnetized can be changed according to the unmagnetized member 410 to be magnetized. The optimum magnetizing conditions may be set experimentally depending on the material, shape, or number of poles of the unmagnetized member 410.

Figure 6:
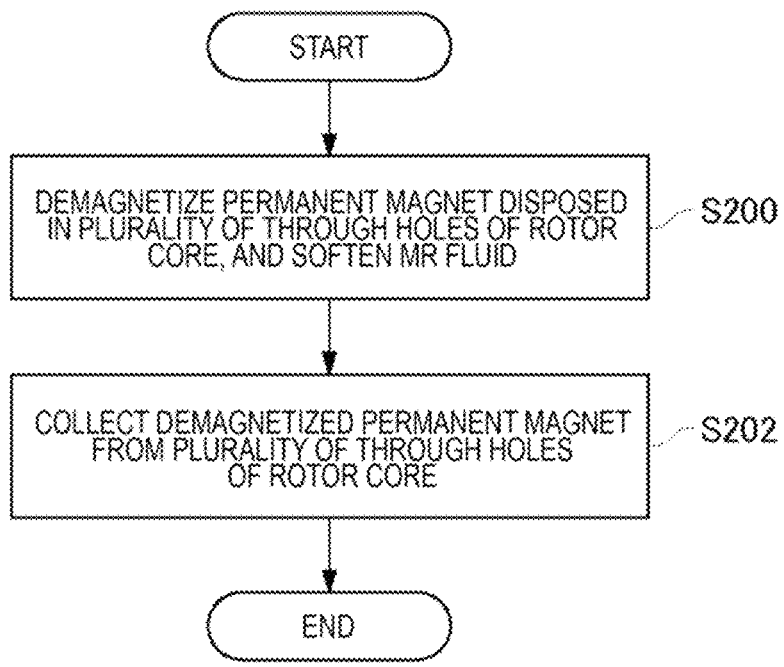
FIG. 6 is a flowchart showing an example of a procedure for collecting the permanent magnet from the rotor core.
Figure 7A:
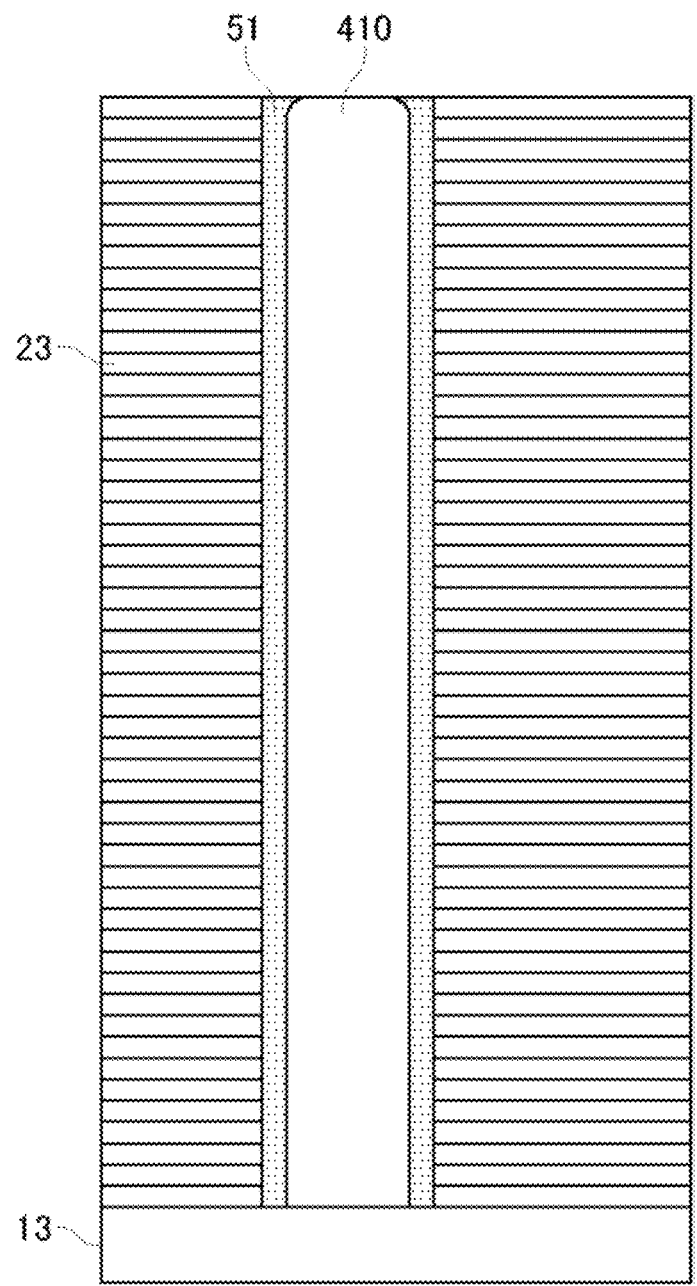
FIG. 7A is a diagram for explaining a procedure for collecting the permanent magnet from the rotor core.
Figure 7B:
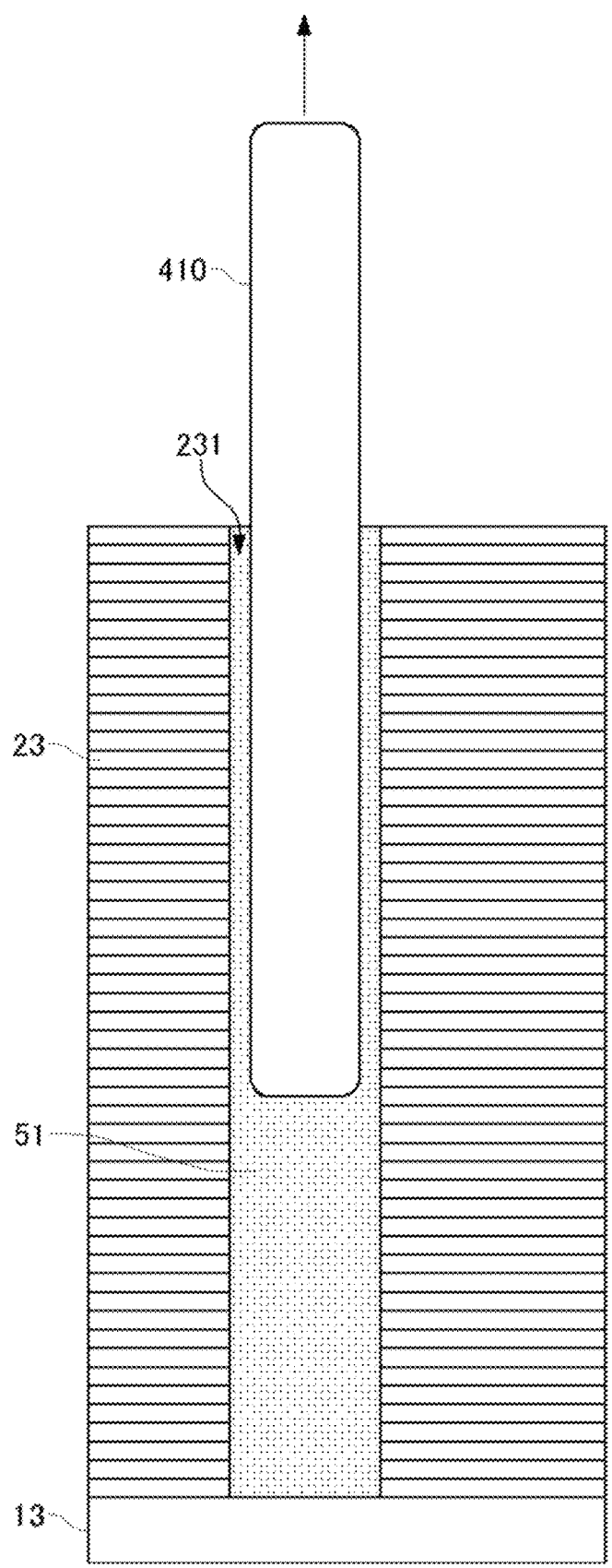
FIG. 7B is a diagram for explaining a procedure for collecting the permanent magnet from the rotor core.

FIG. 6 is a flowchart showing an example of a procedure for collecting the permanent magnet 41 from the rotor core 21. First, the permanent magnet 41 disposed in the plurality of through holes 231 of the rotor core 21 is demagnetized and changed into the unmagnetized member 410 to soften the MR fluid 51 (S200). For example, the demagnetization of the permanent magnet 41 may be performed by continuously reversing the magnetic field using the above-mentioned magnetizing device to remove the magnetic force. Alternatively, the demagnetization of the permanent magnet 41 may be performed by removing the magnetic force by thermal demagnetization or AC demagnetization. FIG. 7A shows a state in which the permanent magnet 41 is demagnetized and the MR fluid 51 is softened. Next, as shown in FIG. 7B, the unmagnetized member 410, which is the demagnetized permanent magnet 41, is collected from the inside of the plurality of through holes 231 of the rotor core 21 (S202).

By demagnetizing the permanent magnet 41, the magnetic field around the MR fluid 51 weakens and softens. As a result, the fixing of the permanent magnet 41 to the through hole 231 is released, and the permanent magnet 41, that is, the unmagnetized member 410 can be easily taken out from the through hole 231. Therefore, according to the rotor 11 of the present embodiment, it is possible to provide the rotor 11 in which the rotor 11 is easily disassembled at the time of recycling and the permanent magnet 41 is easily recycled.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

11: rotor
13: end face plate
21: rotor core
23: thin plate
31: shaft
41: permanent magnet
51: MR fluid
60: collar
101: rotary electric machine
102: case
103: stator
104: stator core
105: coil
106: conductor
107: segment coil
200: pedestal
202: upper lid
202a: injection hole
231: through hole
300: nozzle
410: unmagnetized member

What is claimed is:

1. A rotor comprising:
a rotor core fixed to a shaft and including a plurality of through holes along an axial direction of the shaft;
a permanent magnet disposed in each of the plurality of through holes;
a functional fluid having a magneto rheological effect of fixing the permanent magnet in each of the plurality of through holes;
a pair of end face plates disposed at one end and another end of the rotor core in the axial direction of the shaft, the pair of end face plates covering end surfaces of the permanent magnet disposed in each of the plurality of through holes; and
a pair of collars fixed to an outer peripheral surface of the shaft and abutting an outer surface of each of the pair of end face plates in the axial direction, such that the rotor core and the pair of end face plates are pressed inward in the axial direction and fixed to the shaft.

2. The rotor according to claim 1, wherein the functional fluid is an MR fluid.

3. A rotary electric machine comprising:
the rotor according to claim 1; and
a stator configured to rotatably hold the rotor.

4. The rotary electric machine according to claim 3, wherein the functional fluid is an MR fluid.

5. A method of manufacturing a rotor, comprising:
inserting an unmagnetized member into each of a plurality of through holes that are included in a rotor core fixed to a shaft and that are along an axial direction of the shaft;
filling each of the plurality of through holes into which the unmagnetized member is inserted, with a functional fluid having a magneto rheological effect; and
magnetizing the unmagnetized member into a permanent magnet to cure the functional fluid and fix the permanent magnet to each of the plurality of through holes.

6. The method of manufacturing a rotor according to claim 5, wherein the functional fluid is an MR fluid.

7. The method of manufacturing a rotor according to claim 5, further comprising disposing, before the inserting, the rotor core on a pedestal to cover a lower end of the plurality of through holes, wherein
the filling includes injecting the functional fluid via one or more injection holes in an upper lid of the pedestal.

8. A method of collecting a permanent magnet, comprising:
demagnetizing the permanent magnet disposed in each of a plurality of through holes that are included in a rotor core fixed to a shaft and that are along an axial direction of the shaft, the permanent magnet being fixed in each of the plurality of through holes by a functional fluid having a magneto rheological effect; and
collecting the demagnetized permanent magnet from inside of each of the plurality of through holes, wherein
the demagnetizing of the permanent magnet softens the functional fluid and causes the demagnetized permanent magnet to be unfixed.

9. The method of collecting a permanent magnet according to claim 8, wherein the functional fluid is an MR fluid.

* * * * *